(12) United States Patent
Perry

(10) Patent No.: US 6,515,737 B2
(45) Date of Patent: Feb. 4, 2003

(54) HIGH-RESOLUTION IMAGING AND TARGET DESIGNATION THROUGH CLOUDS OR SMOKE

(75) Inventor: Michael D. Perry, Downy, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/754,884

(22) Filed: Jan. 3, 2001

(65) Prior Publication Data

US 2002/0005942 A1 Jan. 17, 2002

Related U.S. Application Data

(60) Provisional application No. 60/174,364, filed on Jan. 4, 2000.

(51) Int. Cl.[7] .............................. G01C 3/08; H04N 7/18; H04N 9/47
(52) U.S. Cl. ...................... 356/5.04; 356/5.03; 348/144
(58) Field of Search ............................... 356/3.01–5.15, 356/5.03, 5.04; 348/144–147, 31

(56) References Cited

U.S. PATENT DOCUMENTS

| | | | | |
|---|---|---|---|---|
| 3,604,803 A | * | 9/1971 | Kahn ............................ | 356/5 |
| 3,650,627 A | * | 3/1972 | Noxon .......................... | 356/4 |
| 3,752,581 A | * | 8/1973 | Everest et al. ............. | 356/5.03 |
| 4,045,795 A | * | 8/1977 | Fletcher et al. ............. | 343/5 |
| 4,130,360 A | * | 12/1978 | Courtenay .................... | 356/4 |
| 4,153,366 A | * | 5/1979 | Mamon et al. ................ | 356/5 |
| 4,203,665 A | * | 5/1980 | Boulais ......................... | 356/4 |
| 4,259,592 A | * | 3/1981 | Frungel et al. .............. | 250/574 |
| 4,320,397 A | * | 3/1982 | Constantinides ............ | 343/7.5 |
| 4,517,458 A | * | 5/1985 | Barringer ..................... | 250/253 |
| 4,727,374 A | * | 2/1988 | Boulais ......................... | 342/50 |
| 4,920,412 A | * | 4/1990 | Gerdt et al. ................... | 358/95 |
| 4,964,721 A | * | 10/1990 | Ulich et al. .................... | 356/5 |
| 5,029,009 A | * | 7/1991 | Ulich et al. .................. | 358/209 |
| 5,192,978 A | * | 3/1993 | Keeler ........................... | 356/5 |
| 5,231,401 A | * | 7/1993 | Kaman et al. ................ | 342/55 |
| 5,243,541 A | * | 9/1993 | Ulich ............................ | 348/31 |
| 5,270,780 A | * | 12/1993 | Moran et al. ................. | 356/5 |
| 5,345,304 A | * | 9/1994 | Allen ............................ | 356/5 |
| 5,371,368 A | * | 12/1994 | Alfano et al. ............. | 250/341.1 |
| 5,384,589 A | * | 1/1995 | Ulich et al. ................... | 348/31 |
| 5,408,541 A | * | 4/1995 | Sewell ........................ | 382/48 |
| 5,450,125 A | * | 9/1995 | Ulich et al. ................... | 348/31 |
| 5,467,122 A | * | 11/1995 | Bowker et al. ............. | 348/144 |
| 5,712,678 A | * | 1/1998 | Hofmann ..................... | 348/117 |
| 5,760,887 A | * | 6/1998 | Fink et al. ................. | 356/5.03 |
| 5,831,570 A | * | 11/1998 | Ammar et al. ................ | 342/26 |
| 5,847,394 A | * | 12/1998 | Alfano et al. ............. | 250/341.8 |
| 5,905,261 A | * | 5/1999 | Schotland et al. ......... | 250/341.8 |
| 5,920,276 A | * | 7/1999 | Frederick ..................... | 342/26 |
| 6,052,190 A | * | 4/2000 | Sekowski et al. ........... | 356/376 |
| 6,057,909 A | * | 5/2000 | Yahav et al. ............... | 356/5.04 |
| 6,205,353 B1 | * | 3/2001 | Alfano et al. ............... | 600/476 |
| 6,281,509 B1 | * | 8/2001 | Ryan et al. ................. | 250/397 |

* cited by examiner

Primary Examiner—Thomas H. Tarcza
Assistant Examiner—Brian Andrea
(74) Attorney, Agent, or Firm—Michael C. Staggs; Christopher J. Horgan; Alan H. Thompson

(57) ABSTRACT

A method and system of combining gated intensifiers and advances in solid-state, short-pulse laser technology, compact systems capable of producing high resolution (i.e., approximately less than 20 centimeters) optical images through a scattering medium such as dense clouds, fog, smoke, etc. may be achieved from air or ground based platforms. Laser target designation through a scattering medium is also enabled by utilizing a short pulse illumination laser and a relatively minor change to the detectors on laser guided munitions.

21 Claims, 2 Drawing Sheets

HIGH-RESOLUTION IMAGING AND TARGET DESIGNATION THROUGH CLOUDS OR SMOKE

This application claims priority to Provisional Patent Application Ser. No. 60/174,364, titled "High-Resolution Imaging And Target Designation Thru Clouds Or Smoke" filed Jan. 4, 2000, incorporated herein by reference.

The United States Government has rights in this invention pursuant to Contract No. W-7405-ENG-48 between the United States Department of Energy and the University of California for the operation of Lawrence Livermore National Laboratory.

FIELD OF THE INVENTION

The invention relates generally to the imaging of objects and more particularly to an approach for imaging of objects through a medium.

BACKGROUND OF THE INVENTION

Imaging through clouds and/or fog by radar is a well established technique. However, conventional radar based reconnaissance systems provide insufficient resolution for many applications. Synthetic aperture radar systems have been recently developed which provide high resolution images at moderate range (approximately 6 km). These systems suffer from various limitations associated with the extensive computations required to produce an image and are not adequate for target designation.

SUMMARY OF THE INVENTION

Aspects of the present invention include a method comprising: generating pulsed electromagnetic radiation having a predetermined wavelength through a scattering medium towards a target; receiving reflections of the pulsed electromagnetic radiation through the scattering medium from the target; and forming a temporally gated image of the target using a ballistic component of the reflected pulsed electromagnetic radiation.

Further aspects of the present invention include an apparatus comprising: a means for generating pulsed electromagnetic radiation having predetermined wavelength through a scattering medium towards a target; a means for receiving reflections of the pulsed electromagnetic radiation through said scattering medium from the target; and a means for forming a temporally gated image of the target using a ballistic component of the reflected pulsed electromagnetic radiation.

BRIEF DESCRIPTION OF THE DRAWINGS

The accompanying drawings, which are incorporated into and form a part of the disclosure.

DETAILED DESCRIPTION OF THE INVENTION

Figure 1:
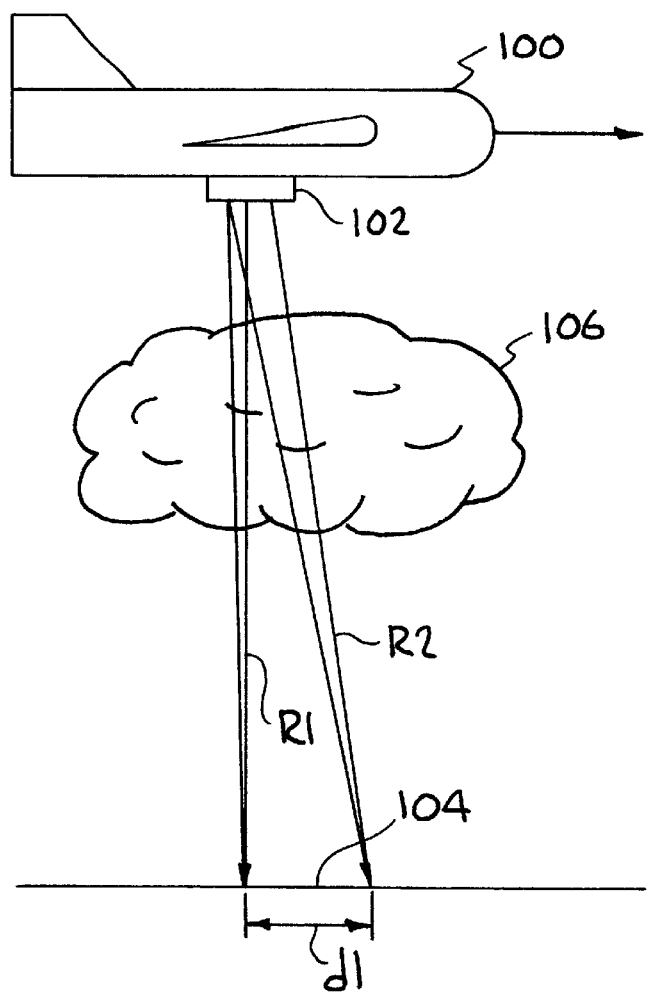
FIG. 1 is a schematic representation of an embodiment of the system.

The method and system disclosed are concerned with imaging and target designation through obscurants (e.g., clouds, rain, fog, smoke, etc.) in the optical regime. The method and system disclosed herein are applicable to imaging through many different types of obscurants. For exemplary purposes, water droplets (e.g., clouds, fog) will be used in order to provide a quantitative analysis of a typical deployment scenario. FIG. 1 discloses a typical example of operation. An aerial platform such as an aircraft 100 (e.g., unmanned aerial vehicle (UAV)) having an optical pod 102 (shown in detail in FIG. 2 and discussed further below) provides illumination to and receives return signals from a target area 104 having a length d1 (e.g., approximately 100 meters (m)). The aircraft will typically operate in the range of approximately 5000 to 15,000 feet above the target area to conduct an operation. However, the aircraft may operate as low as 1000 feet or greater than 15,000 feet to conduct an operation. The illumination signal will include a short path signal I1 and long path signal I2. The return signal will be made up of a short path signal R1 and a long path signal R2. The illumination and return signals will travel through medium 106 such as clouds, rain, etc. during the transmission and reception of information from the target area 104. The illumination signal and return signal are comprised of photons. To describe attenuation of photons incident on the target 104 by the medium 106 such as clouds the extinction coefficient, $\alpha_{ext}$, is used.

The extinction coefficient, $\alpha_{ext}$, is the sum of the scattering coefficient, $\alpha_{scat}$ and the absorption coefficient, $\alpha_{abs}$. The absorption coefficient for water over the wavelength of interest is sufficiently small that it may be neglected and the focus may be placed on the scattering coefficient. The scattering coefficient, $\alpha_{scat}$, is composed of two principal contributions: Rayleigh scattering from individual molecules and Mie scattering from water droplets, dust, smoke, etc.

Rayleigh scattering from atmospheric gases is described by, $$\alpha_{Rayl}(\lambda) = \frac{8\pi^3(n^2-1)^2}{3N\lambda^4} \frac{6+3\delta}{6-7\delta}$$

where N is the number of molecules per unit volume, n is the refractive index of the medium, $\lambda$ is the radiation wavelength, and $\delta$ is the depolarization factor. Over the wavelength range of interest, the depolarization factor, $\delta$, may be approximately 0.035. From this expression and a model of the density distribution of the atmosphere, it is possible to calculate the loss of optical radiation due to Rayleigh scattering over the propagation distance of interest.

At atmospheric pressure and T=15° Celsius (C.), the following results were obtained:

| Wavelength ($\mu$m) | $\alpha_{Rayl}$ (km$^{-1}$) | $\tau_{Rayl}$ | Transmission$_{Rayl}$ |
|---|---|---|---|
| 0.36 | 6.680 × 10$^{-2}$ | 0.5653 | 0.5682 |
| 0.40 | 4.303 × 10$^{-2}$ | 0.3641 | 0.6948 |
| 0.45 | 2.644 × 10$^{-2}$ | 0.2238 | 0.7995 |
| 0.50 | 1.716 × 10$^{-2}$ | 0.1452 | 0.8648 |
| 1.06 | 8.458 × 10$^{-3}$ | 0.0072 | 0.9928 |
| 1.3 | 3.739 × 10$^{-2}$ | 0.0033 | 0.9967 |

The second column is the Rayleigh scattering coefficient at sea level (pressure (P)=1 atmosphere (atm)) and the third column is the optical thickness of the atmosphere for the wavelength of interest. Specifically, it is the scattering coefficient integrated over the column density of the atmosphere from sea level to the outer atmosphere, $$\tau_{Rayl} = \int_0^\infty \alpha_{Rayl}(\lambda, z) dz$$

The attenuation of an incident beam by Rayleigh scattering is given simply by,

Transmission=Exp[-$\tau_{Rayl}$(Z)]=Exp[-$\int \alpha_{Rayl}(\lambda,z)dz$]

This is shown in the fourth column above. For the long wavelength region of approximately 850 to approximately 1060 nanometers (nm) the effect of Rayleigh scattering may be negligible and is neglected hereafter.

Mie scattering from atmospheric gases is described as follows. Although the absorption of light by clouds is weak, it is normally impossible to "see" through a thick cloud. This is due to the phenomenon of Mie scattering by water droplets within the clouds. Photons incident on a medium 106 such as clouds as shown in FIG. 1, are scattered by water droplets of radius, a, and refractive index, n=1.33. The extinction cross section is enhanced by a scattering enhancement factor, $Q_{ext}$, over the geometrical cross section due to diffraction from the droplet. The magnitude of diffraction is determined by the ratio of the particle size to the wavelength of the incident light through the parameter, x=ka=2 Πa/λ. Mie scattering produces light scattered primarily in the forward direction. As light passes through a cloud of such particles, it will undergo many very small deflections. The light may be regarded as comprising discrete photons which travel along straight paths except for an occasional small deflection. A distribution of photons that initially head in a single direction as a collimated beam, will be spread into a range of angles by passage through the cloud. The probability of observing an undeflected photon will diminish exponentially with cloud thickness, not because the light is absorbed but because it is removed from the original direction to appear in a scattered direction. The scattering enhancement, $Q_{ext}$, is as follows:

$$Q_{ext} = 2 - \frac{4}{p}\sin p + \frac{4}{p^2}(1 - \cos p)$$

where p=2Δ(ka)=2 ka(n−1)=4π(n−1)a/λ.

Clouds and fog consist of a distribution of small water droplets, typically having a mean radius of several microns, larger than the wavelength of visible or near-infrared laser light. The extinction coefficient, $\alpha_{ext}$, is dominated by the drops in the range of approximately 5 to 20 μm. In this range, the scattering parameter, p, varies from approximately 20 to 100 for λ=1 μm light. In this regime, the approximation that $Q_{ext}$=2 is sufficient.

The scattering coefficient, $\alpha_{scat}$, is determined by integrating the cross section over the distribution of scatterers, $$\alpha_{scat} = N \int_0^\infty f(a)\sigma(a) da = N \int_0^\infty f(a)Q(a)\pi a^2 da$$

where f(a) is the normalized distribution function for the scatterers, i.e., f(a)da is the probability of finding a droplet with radius in the range a to a+da. A common distribution function used for clouds and fog is the following:

$$f(a) = \left[\frac{u}{r}\right]^{u+1} \frac{a^u}{u!} \exp[-ua/r]$$

where u is an integral parameter characterizing the full width at half maximum of the distribution, and a=<r> is the most probable radius. An average radius approximation of the scattering coefficient is given by, $\alpha_{scat}$=N<Q$\sigma_{geom}$>=N<Q>π<a>$^2$ Clouds are described in terms of their water content, M (gm/m3). Since the mass of a given droplet is simply, 4π$p_{water}$a$^3$. The number of droplets is, $$N = \frac{3M}{4\pi a^3 p_{water}}$$

Combining equations and the resulting scattering coefficient is, $$\alpha_{scat} = \frac{3MQ}{4\langle a \rangle p_{water}}$$

For a given water content, the scattering coefficient decreases with increasing droplet size. The average water content of various types of clouds may fall in the range of approximately 0.1 to 0.3 gm/m$^3$. A typical cumulus cloud with a water content of 0.1 gm/m' and an average radius of 6 gm has a droplet density of 1×10$^8$ droplets/m$^3$ Assuming M=0.1 gm/m3 and <a>=6 μm, the following is obtained, $\alpha_{scat}$ is equal to approximately 0.025 rri'.

The scattering coefficient may then be used to determine the image of the target 104. Photon migration through a scattering medium may be categorized into three major signal components: first, ballistic (coherent) photons which arrive first at a receptor after striking a target area by travelling over the shortest most direct path; second, the snake (quasi-coherent) photons which arrive later than the ballistic photons and which deviate, only to a very slight extent, off a straight-line propagation path; and third, the diffusive (incoherent) photons which experience comparatively more scattering than do ballistic or snake photons and, therefore, deviate considerably more from the straight-line propagation path followed by the ballistic and snake photons. Ballistic photons are used in the system and method described herein to obtain an accurate image of the target 104 since they carry the original image information.

The ballistic photons may be exponentially attenuated by scattering:

I(z)=$I_0$exp[-$\alpha_{scat}$z]

For a medium droplet cloud of typical water content, 0.1 gm/m$^3$ and a length of 500 meters, the transmission is approximately exp[−0.016*500]=3.35×10$^{-4}$, i.e., approximately only 1 out of every 3000 photons passes in a straight line through the cloud. Attenuation of the ballistic signal as a function of distance through the scattering medium. For different cloud conditions (e.g., water content, particle size), the extinction coefficient and therefore the transmission of the ballistic signal may be different. It is also evident that the ballistic photons travel the shortest distance to the image plane and it is only these ballistic photons that carry any original image information. Furthermore, since the optical path from a point on the object through the imaging system will be the same for all ray paths comprising the image, all ballistic photons will arrive at the image plane at approximately the same time provided they were emitted from the object simultaneously.

Figure 2:
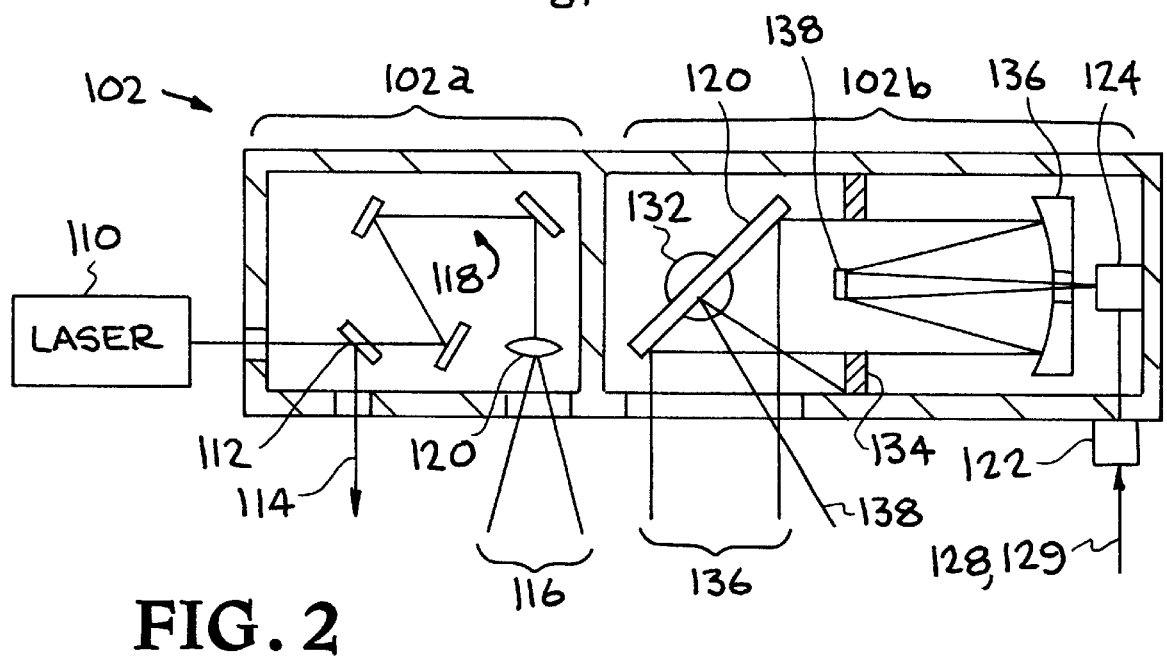
FIG. 2 is a schematic representation of an optical pod used in the system of FIG. 1.

As discussed above, FIG. 1 discloses a aircraft flying within or above the clouds at an altitude of approximately 5,000 to 15,000 ft. An optical pod 102 mounted on the bottom of the plane may emits bursts, for example, of 1 nanosecond (nsec) radiation at a repetition rate of 2 kilohertz (kHz). The details of the optical pod 102 containing the receiver are shown in FIG. 2. The optical pod 102 comprises a laser 110, a passive transmitter section 102a and a receiving telescope 102b. The transmitting section 102a of the optical pod 102 is designed to eliminate the need for the aircraft to maintain a specific altitude. Laser 110 may be a compact, diode-pumped short-pulse laser, preferably operating in the wavelength bands of interest approximately 350 to 380 nm and approximately 850 to 1100 nm. These two wavelength ranges are ideal for active imaging for the reasons discussed below. First, these wavelength ranges are easily transmitted by the atmosphere and are only weakly attenuated by typical obscurants (e.g., water vapor, smoke). Second, the short-wavelength (approximately less than 1000 nm) is well suited to conventional optical imaging systems with the resolution limited only by the numerical aperture of the imaging system and atmospheric distortion. Third, the range is well suited to diode-pumped solid-state lasers and sensors. For examplary purposes, the specifications of a laser system may be the following:

Repetition Rate: Variable from 2 to 10 kHz
Average Power: 300 W or 200 W
Pulse Duration: 2.5 nsec or 1.5 nsec The laser 110 produces a laser pulse which passes through a 5 to 10% beam splitter 112 producing a first "trigger" pulse 114 and a second primary "illuminator" pulse 116. The trigger pulse 114 which is characterized by low divergence and having approximately 5 to 10% of the pulse energy is directed through the medium 106 towards the ground. The remainder of the laser pulse passes through an optical delay section 118 of approximately 4 to 10 nsec and preferably 6 nsec. The illuminator pulse 116 passes through a variable telescope 120 which allows the pilot of the aircraft 100 to control the divergence of the illuminator beam and hence the illuminated area on the ground 104.

Figure 3:
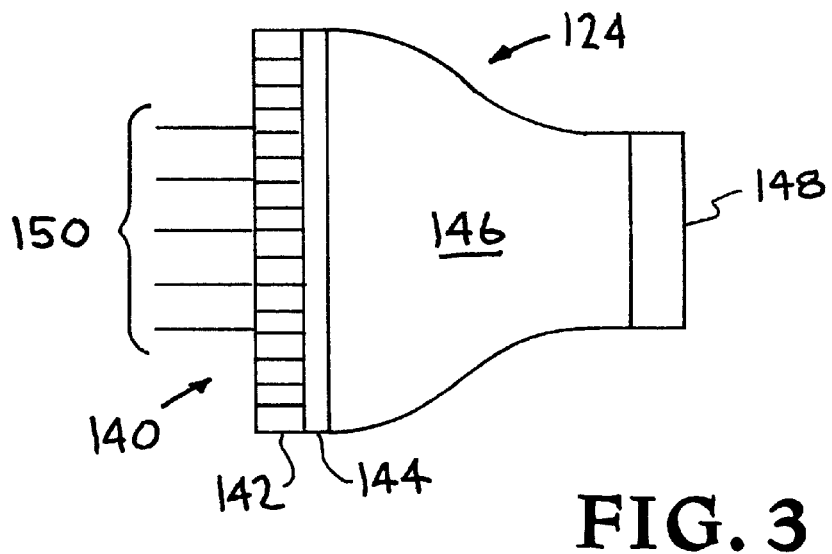
FIG. 3 is a schematic representation of a gated intensifier used in the optical pod of FIG. 2.

Receiving telescope 102b is made up of an acquisition mirror 120 mounted on a gimble 132. Acquisition mirror 120 captures on-axis light 136 which is a reflection from the illuminator pulse 116 striking the target area 104 and directs it towards a primary mirror 136. The acquisition mirror 120 directs off-axis light 138 towards an aperture stop 134 (e.g., baffles). The primary mirror 136 directs the light towards a focus 138. Focus 138 concentrates the light on a gated intensifier 124. FIG. 3 is an enlarged version of the gated intensifier 124. The gated intensifier includes a photocathode 140, a microchannel plate 142, a phosphor screen 144, a fiber optic taper 146 and a charge-coupled device (CCD) 148. Photons 150 create electrons on the photocathode 140. These electrons are accelerated by a field across the microchannel plate 142 wherein they produce a cascade of secondary electrons by collisions with the walls inside an individual channel. This cascade of secondary electrons produces an amplification factor of approximately 103 per incident electron for a typical microchannel plate 142 biased at approximately 1000 Volts (V). Gating is accomplished by pulsing the voltage applied across the plate 142. As discussed in detail below, the trigger pulse reflection from the target area 104 will perform the gating function. When the field is applied, photoelectrons emitted from the photocathode 140 experience gain within the plate 142. When the field is off, there is no amplification and the primary electron never makes it through the channel of the microchannel plate 142. The amplified electrons strike the phosphor screen 144 at the rear of the intensifier 124. The fluorescence from this phosphor screen 144 is then imaged through fiber optic taper 146 onto the multipixel charge coupled device (CCD) array 148. CCD 148 is a multi-frame imager that may operate with gate times as short as 50 picoseconds (psec). Gated intensifiers 124 are commercially available with gate times as short as 400 psec and a dark current (noise) of approximately 1 count/pixel during the gate. Photodiode 122 is also coupled to the gated intensifier 124 and will provide the trigger pulse information.

Figure 4:
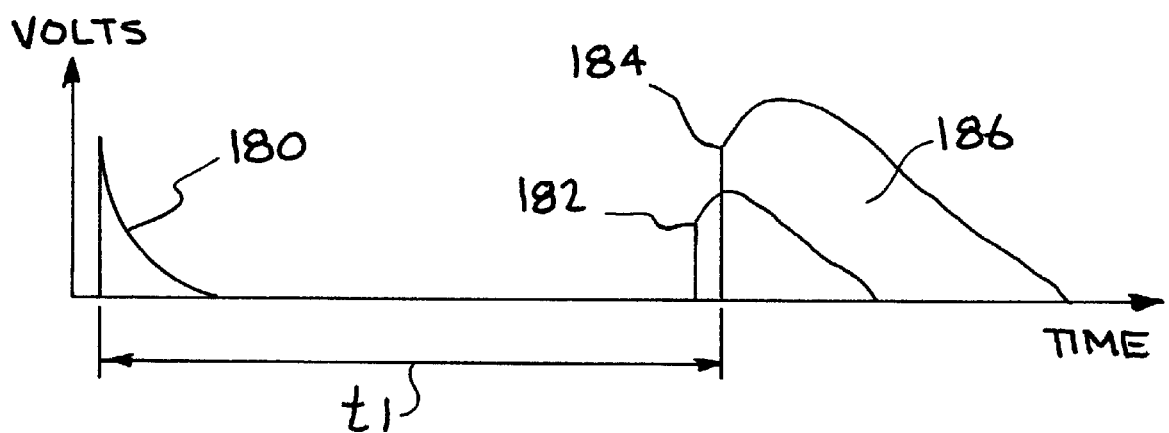
FIG. 4 is a graph showing the arrival of photons at the gated intensifier.

In operation, both the trigger and illuminator pulses 114, 116 travel the approximately 10 $\mu$sec from the aircraft 100 to the target area 104 and one pulse is simply delayed from the other by approximately 6 nsec. The trigger pulse produces two return signals. The first return trigger pulse signal 128 is the Mie backscatter from the medium 106 on the outgoing path and is detected by photodiode 122 mounted on the bottom of the pod 102 near the gated intensifier 124. The time-dependent amplitude of this first return trigger pulse signal provides a measure of the density of the medium 106 and the distance from the aircraft 100 to the bottom of the medium. FIG. 4 shows this first return trigger pulse signal as reference numeral 180 on a graph of volts versus time during the reconnaissance time period. The second return trigger pulse signal is the return from the ground and is detected by photodiode 122. The leading edge of the second return trigger pulse (i.e., the ballistic component) as illustrated by reference numeral 182 in FIG. 4 and activates the high voltage on the microchannel plate 142 of the gated intensifier 124. The high voltage pulse is pre-programmed to have a gate width of approximately 8 nsec and follow the photodiode trigger pulse by 6 nsec. With this technique, the altitude of the aircraft 100 is removed from the problem. All triggering of the receiver electronics is optical. The gated intensifier 124 is now turned on and receives the ballistic component (reference numeral 184 in FIG. 4) of the reflection of the illuminator pulse from the target area 104. FIG. 4 also shows receipt of the mie forward scatter from the medium 106 (reference numeral 186). The time, t1, from the receipt of the first return trigger pulse signal to the arrival of the ballistic component may be approximately 20 $\mu$sec. The time of flight distance between the shortest ray path l1 and longest ray path l2 may be only approximately 0.5 nsec which is much less than the gate width. For reconnaissance at a slant, this difference increases but can be compensated by both optical and mathematical means. By using a gated detector, it is possible to detect only the ballistic photons while discriminating against all others. The gated detector is turned on only for a very short duration to allow the ballistic photons to be detected The gated intensifier 124 is connected to a processor (not shown) which analyzes the image information received from the ballistic photons to prepare an image of the target area 104.

The energy required to produce an illuminator pulse 116 that will provide the ballistic photons also needs to be calculated. The photons of the illuminator pulse 116 traverse the cloud layer and strike the ground, whereupon they undergo both absorption and scatter from ground terrain. The photons reflected from the ground must again pass through the medium 106 to reach the optical pod 102 on the aircraft 100. In order to calculate the laser power required of the laser 110 to produce a high contrast image of the target area 104, the first step is to estimate the signal strength. The signal from a single resolution element on the ground can be written as the product of several factors:

Signal (S)=[laser pulse energy incident on ground element]
x [albedo of ground element]
x [attenuation by medium (e.g., cloud)]
x [area of receiver/area scattered into by ground]
x [Quantum efficiency of photocathode]

The following definitions apply:

| | |
|---|---|
| $E_p$ | Initial laser pulse energy into ground element |
| $E_g$ | Laser pulse energy reflected by ground element = $E_p$*(albedo of ground element) |
| $A_g$ | area on ground covered by laser beam without cloud |
| $A_r$ | area of receiver |
| $h$ | height of source from ground |
| $\eta$ | Quantum efficiency of photocathode |
| $L$ | thickness of cloud |

It may be assumed that the object of interest is a pure diffuse scatterer, i.e., it scatters radiation uniformly into $2\pi$. Thus, $S$(photons/element)=$\eta E_p$(photons/element)*(albedo of ground element)

*$\exp[-\alpha_{ext}L]*(\pi r^2_{mirror}/2\pi h^2)$

Inverting leads to the following:

$E_p$(photons/element)=$S$(photons/element)/($\eta$(albedo of ground element)

*$\exp[-\alpha_{ext}L]*(d_{mirror}/h)^2/8)$

Using a typical albedo of 0.35, a 30 centimeter (cm) primary mirror 136 and an altitude of 10,000 feet leads to the following:

$$E_p\text{(photons/element)} = 8 * 2\text{(photoelec/element)}/$$
$$(\eta * 0.35 * \exp[-016 * 200] * (1_r/10,000)$$
$$= 1.1 \times 10^{11} \text{(photoelec/element)}/\eta$$

The quantum efficiency, $\eta$, of a photocathode 140 used in the receiver section 102b of the optical pod 102 is the number of photoelectrons produced per incident photon. The quantum efficiency varies strongly with wavelength due to the work function and electron affinity of the cathode material. Various cathode materials that may be suitable include fused silica input window, S-20, S-25, GaAs or InGaAs coated specialty windows from Coming (Coming #7056), a cluster compound, and Si/Cs/O. The quantum efficiency of various cathode material operating in the visible and near infrared are preferred since operation in the visible region of the spectrum may be problematic for two principal reasons: 1) the increased sensitivity of the human eye in the visible regime reduces the maximum permissible exposure (MPE) level to values sufficiently low that it would be difficult to certify the system as eye safe at the power levels required for ballistic imaging for airborne reconnaissance and 2) the Mie scatter from the cloud would be readily observable by an enemy in military operations, thereby eliminating the ability for covert reconnaissance. For these reasons, as previously discussed, a practical illumination system should operate at wavelengths in the range of approximately 350 to 380 nm or approximately 850 to 1100 nm.

Using a quantum efficiency of $\eta$=0.5%, the laser pulse energy per element becomes, $E_p$=2.2×10$^{13}$ (photons/element)

For the wavelength 1064 nm, this translates to an incident pulse energy of $E_p$=4.2 microJoules/element This is the number of photons (laser energy) incident on a single ground element. A typical ground resolution would be approximately 8 inches (20 cm) corresponding to an area per ground element of 315 cm². Hence, the incident photon fluence is, $\phi_p$=$E_p$/$A$=4.2 $\mu$J/315 cm²=13 nanoJoules (nJ)/cm²

This result is significant since it is more than 105 times below the maximum permissible exposure (MPE) for eye safety at 1060 nm (0.01 J/cm² for a 1 sec exposure) as established by the American National Standards Institute (ANSI).

Since the illuminating laser pulse has also traversed the cloud, the initial laser energy per element is, $$E_{initial} = E_p \exp[\alpha_{ext}L]$$
$$= 2.2 \times 10^{13} \text{(photons/element)} * \exp(.16 * 200)$$
$$= 5.4 \times 10^{14} \text{(photons/element)}$$

Note that there are no area or solid angle factors in this expression since the divergence of the outgoing beam can be arbitrarily adjusted to achieve the desired field of view.

A typical reconnaissance imaging system may have 10$^6$ elements in the focal plane array. With each element corresponding to a ground resolution of 8 inches, the field of view would be approximately 4×10$^4$ m² or 200×200 m. Hence, the total laser energy required to achieve a ballistic image of a 0.2 km×0.2 km field of view is, $$E_{total} = E_{initial} * \text{(Number of elements)}$$
$$= 5.4 \times 10^{20} \text{photons}$$
$$= 101 \text{Joules}$$

This energy can be delivered to the field of view in a single pulse or by multiple pulses. For a typical airspeed of 200 mph (90 m/sec), the aircraft 100 would reside over the field of view for approximately 2 sec. As a result, the average power required would be approximately 50 Watts.

In an alternative embodiment a receiver is no longer mounted adjacent to the transmitter as shown in FIG. 2 but rather may be mounted on laser guided munitions. Note that there is no difference required in any of the control systems associated with the laser guided munition from that associated with conventional laser designation. The only difference is that the detector must be gated to receive only the ballistic signal and thereby discriminate against any light scattered from the smoke or cloud. This may be accomplished by the same two pulse scheme described earlier. The gated detector simply replaces the conventional detector within the munition. A typical targeting scenario would include the following: 1) Reconnaissance officer identifies target through clouds utilizing ballistic photon reconnaissance, 2) Field of view of outgoing laser transmitting telescope is adjusted to apply laser radiation on the target only, 3) Information regarding pulse format from illuminating laser is transmitted to shooting asset thereby insuring that the munition will only pick up ballistic photon signals which originate from a specific designator, 4) munition is fired and acquires target, and 5) flight to target is controlled by conventional laser guidance software.

The foregoing discussion is illustrative only and is not to be construed as limiting thereof. The invention is defined by the following claims, with equivalents of the claims to be included therein.

What is claimed is:

1. A method comprising:
   generating pulsed electromagnetic radiation having a predetermined wavelength selected from the ranges consisting of from about 350 to 380 nm and from about 850 to about 1100 nm through a scattering medium toward a target;
   receiving reflections of said pulsed electromagnetic radiation through said scattering medium from said target; and
   forming a temporally gated image of the target consisting essentially of a ballistic component of the reflected pulsed electromagnetic radiation.

2. A method comprising:
   generating pulsed electromagnetic radiation from an aircraft having a predetermined wavelength selected from the ranges consisting of from about 350 to about 380 nm and from about 850 to about 1100 nm through a scattering medium towards a ground-based target;
   receiving reflections of said pulsed electromagnetic radiation at said aircraft through said scattering medium from said ground-based target; and
   forming a temporally gated image of the target consisting essentially of a ballistic component of the reflected pulsed electromagnetic Radiation.

3. A method comprising:
   generating pulsed electromagnetic radiation from an aircraft having a predetermined wavelength selected from the ranges consisting of from about 350 to about 380 nm and from about 850 to about 1100 nm through a scattering medium towards a ground-based target;
   receiving reflections of said pulsed electromagnetic radiation at said aircraft through said scattering medium from said ground-based target; and
   collecting the reflected pulsed electromagnetic radiation consisting essentially of a ballistic component on the aircraft.

4. A method comprising:
   generating an illuminator pulse of electromagnetic through a scattering medium towards a target located at a distance greater than approximately 1000 feet;
   receiving a reflection of said illuminator pulse through said scattering medium from said ground-based target; and
   collecting the reflected illuminator pulse consisting essentially of a ballistic component at a gated temporal sensor.

5. An apparatus comprising:
   a means for generating pulsed electromagnetic radiation having a predetermined wavelength selected from the ranges consisting of from about 350 to about 380 nm and from about 850 to about 1100 nm through a scattering medium towards a target;
   a means for receiving reflections of said pulsed electromagnetic radiation through said scattering medium from said target; and
   a means for forming a temporally gated image of the target consisting essentially of a ballistic component of the reflected pulsed electromagnetic radiation.

6. An apparatus comprising:
   a means for generating pulsed electromagnetic radiation from an aircraft having a predetermined wavelength selected from the ranges consisting of from about 350 to about 380 nm and from about 850 to about 1100 nm through a scattering medium towards a ground-based target;
   a means for receiving reflections of said pulsed electromagnetic radiation at said aircraft through said scattering medium from said ground-based target; and
   a means for forming a temporally gated image of the target on the aircraft consisting essentially of a ballistic component of the reflected pulsed electromagnetic Radiation.

7. An apparatus comprising:
   a means for generating pulsed electromagnetic radiation from an aircraft having a predetermined wavelength selected from the ranges consisting of from about 350 to about 380 nm and from about 850 to about 1100 nm through a scattering medium towards a ground-based target;
   a means for receiving reflections of said pulsed electromagnetic radiation at said aircraft through said scattering medium from said ground-based target; and
   a means for collecting the reflected pulsed electromagnetic radiation consisting essentially of a ballistic component on the aircraft.

8. A method comprising:
   generating a trigger pulse and an illuminator pulse of electromagnetic radiation from an aircraft through a scattering medium towards a ground-based target;
   receiving a reflection of the trigger pulse from said scattering medium at said aircraft to determine the distance from the aircraft to the scattering medium;
   receiving a reflection of the trigger pulse from said ground based-target at said aircraft to determine the distance from the aircraft to the ground-based target and to turn on a sensor on said aircraft;
   receiving a reflection of said illuminator pulse at said aircraft through said scattering medium from said ground-based target; and
   collecting the ballistic component of the reflected illuminator pulse at said sensor.

9. The method of claim 8, wherein said sensor is turned on by said trigger pulse for approximately 4 to 10 nsec.

10. The method of claim 8, wherein said sensor is turned on by said trigger pulse for less than approximately 6 nsec.

11. The method of claim 8, wherein said illuminator pulse is generated with a predetermined wavelength between approximately 350 to 380 nm.

12. The method of claim 8, wherein said illuminator pulse is generated with a predetermined wavelength between approximately 850 to 1100 nm.

13. The method of claim 8, further comprising:
    creating a delay between the trigger pulse and the illuminator pulse.

14. The method according to claim 13, wherein said delay is less than 6 nsec.

15. A method comprising:

generating a trigger pulse and an illuminator pulse of electromagnetic radiation from an aircraft through a scattering medium towards a target located at a distance greater than approximately 1000 feet;

receiving a reflection of the trigger pulse from said target to turn on a sensor;

receiving a reflection of said illuminator pulse through said scattering medium from said target; and collecting the ballistic component of the reflected illuminator pulse at said sensor.

16. An apparatus comprising:

a laser capable of producing a pulse;

a beam splitter coupled to said laser to divide the pulse into a trigger pulse and an illuminator pulse;

a delay section capable of creating a delay between the trigger pulse and the illuminator pulse;

a variable telescope coupled to said delay section and capable of controlling the divergence of the illuminator pulse;

a photodiode capable of receiving a reflection of said trigger pulse from a target;

an acquisition mirror capable of receiving a reflection of said illumination pulse from said target; and a gated intensifier which is turned on by said reflection of said trigger pulse and which collects image information on the target from said reflection of said illumination pulse from said target.

17. The apparatus of claim 16, wherein said gated intensifier includes at least one from the group consisting of a photocathode, a microchannel plate, a phosphor screen, a fiber optic taper and a charge-coupled device (CCD).

18. The apparatus of claim 16, further comprising:

a primary mirror optically coupled to said acquistion mirror and said gated intensifier.

19. The apparatus of claim 16, wherein said delay is less than 6 nsec.

20. An aircraft mounted apparatus comprising:

a laser capable of producing a pulse;

a beam splitter coupled to said laser to divide the pulse into a trigger pulse and an illuminator pulse;

a delay section capable of creating a delay between the trigger pulse and the illuminator pulse;

a variable telescope coupled to said delay section and capable of controlling the divergence of the illuminator pulse;

a photodiode capable of receiving a reflection of said trigger pulse from a ground-based target;

an acquisition mirror capable of receiving a reflection of said illumination pulse from said target; and a gated intensifier which is turned on by said reflection of said trigger pulse and which collects image information on the target from said reflection of said illumination pulse from said target.

21. The aircraft mounted apparatus of claim 20, wherein said gated intensifier is capable of producing optical images having a resolution of less than approximately 20 centimeters.

* * * * *

UNITED STATES PATENT AND TRADEMARK OFFICE
CERTIFICATE OF CORRECTION

PATENT NO. : 6,515,737 B2
DATED : February 4, 2003
INVENTOR(S) : Michael D. Perry It is certified that error appears in the above-identified patent and that said Letters Patent is hereby corrected as shown below:

<u>Title page,</u>
Item [75], Inventors, the address of the inventor should read -- Poway, CA (US) --

Signed and Sealed this

Twenty-fourth Day of February, 2004

JON W. DUDAS
*Acting Director of the United States Patent and Trademark Office*